United States Patent [19]
Clifford

[11] Patent Number: 5,985,457
[45] Date of Patent: Nov. 16, 1999

[54] STRUCTURAL PANEL WITH KRAFT PAPER CORE BETWEEN METAL SKINS

[75] Inventor: David D'Arcy Clifford, Caledonia, Canada

[73] Assignee: Dofasco Inc., Hamilton, Canada

[21] Appl. No.: 08/947,030

[22] Filed: Oct. 8, 1997

Related U.S. Application Data

[60] Provisional application No. 60/038,816, Feb. 10, 1997.

[51] Int. Cl.$^6$ ...................................................... B32B 15/08
[52] U.S. Cl. .......................... 428/416; 428/137; 428/138; 428/414; 428/458; 428/464; 428/481; 428/530; 156/163; 156/244.22; 156/252; 156/313; 156/324.4
[58] Field of Search ..................... 428/414, 416, 428/458, 464, 481, 530, 137, 131, 138; 156/324, 252, 163, 164, 244.22, 313, 324.4, 295

[56] References Cited

U.S. PATENT DOCUMENTS

| | | | |
|---|---|---|---|
| 1,943,757 | 1/1934 | Delaney | 156/280 |
| 2,054,210 | 9/1936 | Weisenburg | 156/209 |
| 2,545,603 | 3/1951 | Byers et al. | 154/132 |
| 3,055,768 | 9/1962 | Lassiter | 156/208 |
| 3,315,514 | 4/1967 | Larsen et al. | 72/363 |
| 3,674,619 | 7/1972 | Scher et al. | 161/119 |
| 3,847,724 | 11/1974 | Powers et al. | 161/161 |
| 4,123,305 | 10/1978 | Krzeszowski | 181/208 |
| 4,188,248 | 2/1980 | Millgardh et al. | 156/164 |
| 4,274,901 | 6/1981 | Elber | 156/208 |
| 4,314,002 | 2/1982 | Oizumi et al. | 428/414 |
| 4,416,949 | 11/1983 | Gabellieri et al. | 428/461 |
| 4,588,458 | 5/1986 | Previsani | 156/71 |
| 4,626,309 | 12/1986 | Mullen, III et al. | 156/289 |
| 4,652,324 | 3/1987 | Yamashina et al. | 156/242 |
| 4,673,606 | 6/1987 | Undén et al. | 156/208 |
| 5,446,250 | 8/1995 | Oka | 181/208 |
| 5,551,197 | 9/1996 | Repp et al. | 52/204.62 |

FOREIGN PATENT DOCUMENTS

| | | |
|---|---|---|
| 468763 | 10/1950 | Canada . |
| 655806 | 1/1963 | Canada . |
| 84069 | 7/1978 | Japan . |
| 57-140 156 | 8/1982 | Japan . |
| 57-140 157 | 8/1982 | Japan . |
| 15594 | 1/1984 | Japan . |
| 63-067 142 | 3/1988 | Japan . |
| 80594 | 8/1988 | Luxembourg . |
| 1225500 | 3/1971 | United Kingdom . |
| WO 91/18738 | 12/1991 | WIPO . |
| WO 96/04441 | 2/1996 | WIPO . |
| 96/23621 | 8/1996 | WIPO . |

OTHER PUBLICATIONS

Brochure: St. Regis Paper Company, Bulletin No. 2M 864 PD–106, published Aug. 1964.

Bubble Steel Sheet Metal for very Light–weight Structures, contribution to SAE Congress 1997; Klaus W. Blümel, Friedrich Behr, Thyssen Stahl AG, Duisberg, Germany.

*Primary Examiner*—Deborah Jones
*Assistant Examiner*—Abraham Bahta
*Attorney, Agent, or Firm*—Dykema Gossett PLLC

[57] ABSTRACT

A structural panel comprises a metal and paper composite in which the metal outer skins have a minimum thickness of 0.005 in. exceeding foils and a maximum thickness of 0.012 in. while the paper core ranges between 0.01 in. and 0.05 in. The panel is a stiff, lightweight substitute for thicker metals and may replace light metal sheets such as aluminum with a composite in which the metal skins comprise sheets from heavier metals such as steel. The paper core is a web which is adhesively bonded to the metal skins and which may have openings to create paths for adhesive bridges between the metal skins to minimize failure caused by buckling.

17 Claims, 10 Drawing Sheets

STRUCTURAL PANEL WITH KRAFT PAPER CORE BETWEEN METAL SKINS

This Application claims the benefit of U.S. Provisional Application No. 60/038,816, filed Feb. 10, 1997.

FIELD OF THE INVENTION

This invention relates to laminating kraft paper between very thin sheets of metal and, more particularly, steel to produce a composite sheet having improved stiffness with little additional cost or weight.

BACKGROUND OF THE INVENTION

Sheets of steel are used in a multitude of applications where strength, durability and ease of manufacture are required at low cost. For example, sheets of steel are used in vehicle bodies, appliances, furniture, construction and packaging. An important measure of a sheet steel's performance is its resistance to elastic deflection, otherwise known as stiffness.

For applications where high stiffness is needed, the thickness of sheet steel must be increased proportionately to the stiffness requirements. The extra material thickness provides additional resistance to elastic deflection. However, increasing the sheet steel's thickness negatively impacts both the cost and weight of the final product.

Thus, while the cost of steel is significantly lower than the cost of aluminum, aluminum has become the material of choice for applications where the weight of the final product is critical. Still more reductions in weight are achieved in construction materials comprising aluminum composite panels having a polymer core and outer metal skins made of aluminum sheet. Such panels find application, for example, in the construction of vehicular trailer bodies as disclosed in U.S. Pat. No. 4,958,472 and U.S. Pat. No. 4,940,279.

It has been recognized that the increased strength-to-weight ratio achieved in such composite panels results from the physical separation of the outer skins, and that a filler material or core material may not be required. In WO96/23621, it is proposed to create hollow panels in which a separation between two sheets of steel is maintained by hemispherically shaped domes formed in one sheet of steel which is selectively welded to an adjacent sheet of steel.

On the other hand, applicant is not aware of any proposals to maintain stiffness in composite panels by substituting alternative core materials for polymer cores. Applicant is also unaware of any proposals to create laminated structural panels in which the outer skins are made of steel. Those applications in which metal laminated to paper are known include inter alia metal clad wiring cards to support electronic components such as in U.S. Pat. No. 4,314,002 where paper is used because of its contribution to dielectric properties and provides no structural advantage. In other known metal and paper laminates, such as wrapping materials disclosed in U.S. Pat. No. 3,055,768, the metal is a very thin aluminum foil which has no structural utility.

An object of this invention is to increase the stiffness of sheet metal for use in structural applications of the kind mentioned above, without adding excessive cost or weight.

SUMMARY OF THE INVENTION

In accordance with this invention, there is provided a structural panel comprising outer skins of sheet metal laminated to a paper core. The metal skins are thicker than foils and have a minimum thickness of 0.005 in. Preferably, the metal skins are also thinner than cards and have a maximum thickness of 0.012 in. The paper core "sandwiched" between the metal skins is relatively thick and has a minimum thickness of 0.01 in. and will usually not exceed 0.05 in.

Preferably, the metal skins are sheet steel and the paper core comprises a single web of kraft paper which has a plurality of openings for creating paths for adhesively bridging the outer skins and to optimize resistance to failure resulting from buckling.

BRIEF DESCRIPTION OF THE DRAWINGS

In order to better understand the invention, preferred embodiments are described below with reference to the accompanying drawings, in which.

DESCRIPTION OF PREFERRED EMBODIMENT

The elastic deflection of a beam, plate or sheet is inversely proportional to the moment of inertia created by the beam, plate or sheet around its axis of deflection. The elastic stiffness of a metal sheet can therefore be increased substantially by increasing the moment of inertia of a metal sheet around its axis of deflection. Conventionally, this is done by increasing the thickness of the metal sheet.

An economical alternative to increasing the metal sheet's thickness, which is proposed by this invention, is to laminate successive sheets of low-cost kraft paper between the exposed sheets of metal, thereby increasing the moment of inertia of the composite sheet and increasing the stiffness of the composite sheet substantially.

The layers of paper may be bonded to each other and to the metal sheets with an adhesive having the necessary bond strength and mechanical characteristics to prevent slippage between the laminating layers, or delamination of the laminating layers from the metal sheets.

Figure 1:
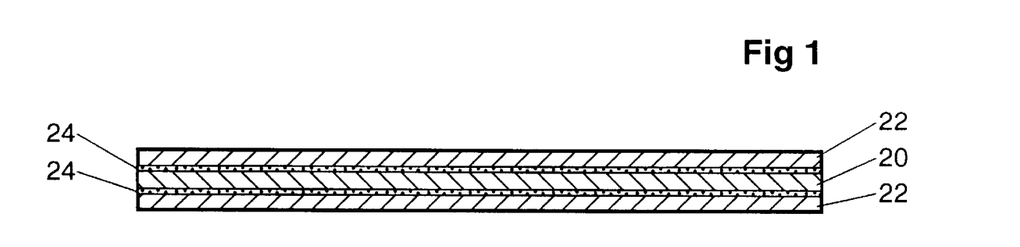
FIG. 1 is a schematic cross-sectional view of a first embodiment of the invention comprising a single ply core of paper.

In its simplest embodiment, drawn in FIG. 1, a structural panel 10 according to the invention comprises a single web of kraft paper 20 sandwiched between two metal sheets 22, the paper being bonded to the metal sheets on respective sides thereof with a layer of adhesive 24.

Figure 2:
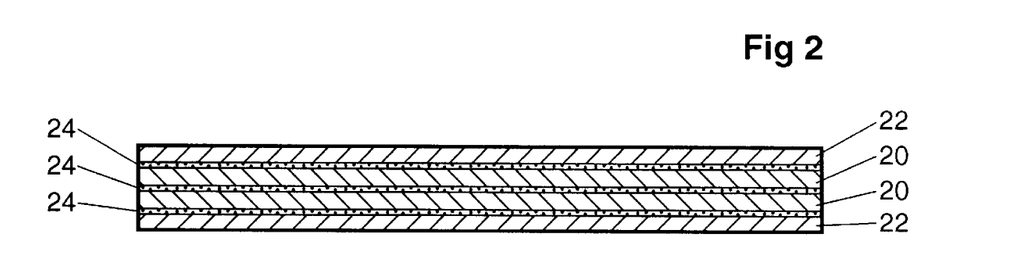
FIG. 2 is a schematic cross-sectional view of a second embodiment of the invention comprising a double-ply core of paper.

Alternatively, the paper core may comprise a plurality of paper webs 20 adhesively bonded to each other and to the outer metal sheets 22, as shown schematically by the structural panel 12 shown in FIG. 2.

As indicated above, the invention provides a means to maintain stiffness while reducing weight thereby allowing thinner metals to be used without compromising performance. By way of example, the description which follows is directed to laminates of sheet steel and paper to show that such composites are viable alternatives to aluminum sheets alone. It will be understood that laminates comprising sheets of metals other than steel and paper are expected to exhibit commensurate improvements in stiffness without the additional cost and weight of increasing the thickness of the metal.

In order for the invention to be suitable as a structural panel, and provide reasonable economic benefits, applicant has determined that the outer metal skins must have a thickness ranging between 0.005 in. and 0.012 in. while the paper core must have a minimum thickness of 0.01 in. and a practical maximum thickness of 0.05 in. A range of product covered by the invention is graphically illustrated by the shaded area drawn in FIG. 3 while the unshaded boxed areas show prior art laminates of metal and paper known to the Applicant. It will be understood that the minimum thickness of 0.005 in. is representative of the practical lowest thickness range to which steel sheet can be rolled without the additional processing costs of producing a so-called "foil".

Figure 3:
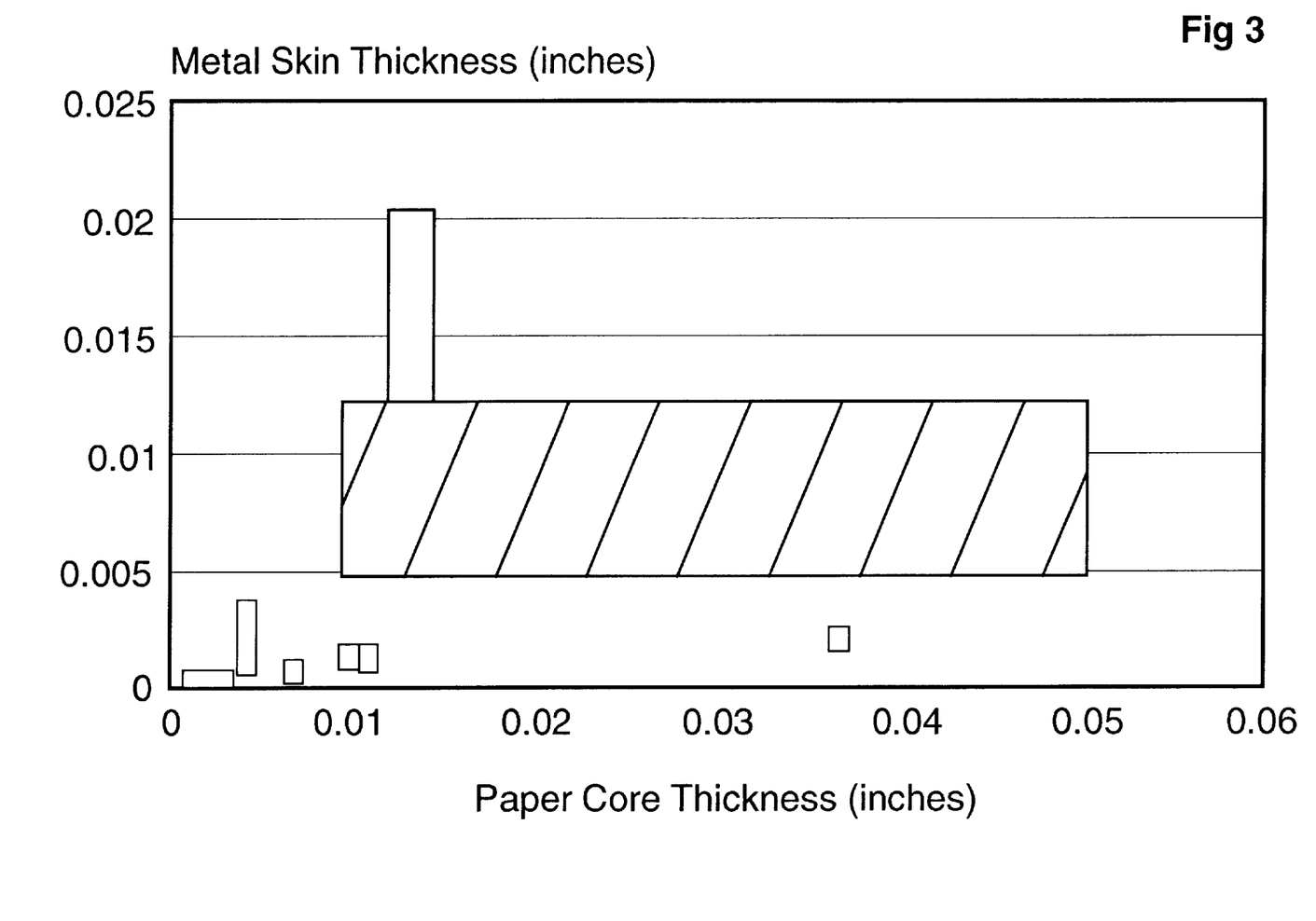
FIG. 3 is a graphical representation showing the relative thickness of metal skins and paper cores for the invention (shaded area) and prior art (unshaded areas)

Table I which follows shows the thickness of aluminum sheet required to provide an equivalent stiffness for various combinations of steel sheet and paper having thicknesses representing the extremities of the shaded area of FIG. 3. It will be observed that the cumulative thickness of a composite panel of the kind shown in FIG. 1 is always less than the thickness of aluminum sheet having equivalent stiffness. Simple calculations will suffice to persuade those skilled in the art that enormous cost savings may be achieved without the weight penalty usually attributed to steel sheets of equivalent stiffness.

TABLE 1

SHEET THICKNESS FOR EQUIVALENT STIFFNESS

| STEEL SKINS | PAPER CORE | COMPOSITE PANEL (EXCLUDING ADHESIVE) | -> | AL SHEET |
|---|---|---|---|---|
| .005" | .01" | 0.020" | -> | .027" |
| .012" | .01" | 0.034" | -> | .048" |
| .005" | .05" | 0.06" | -> | .064" |
| .012" | .05" | 0.074" | -> | .093" |

Figure 4:
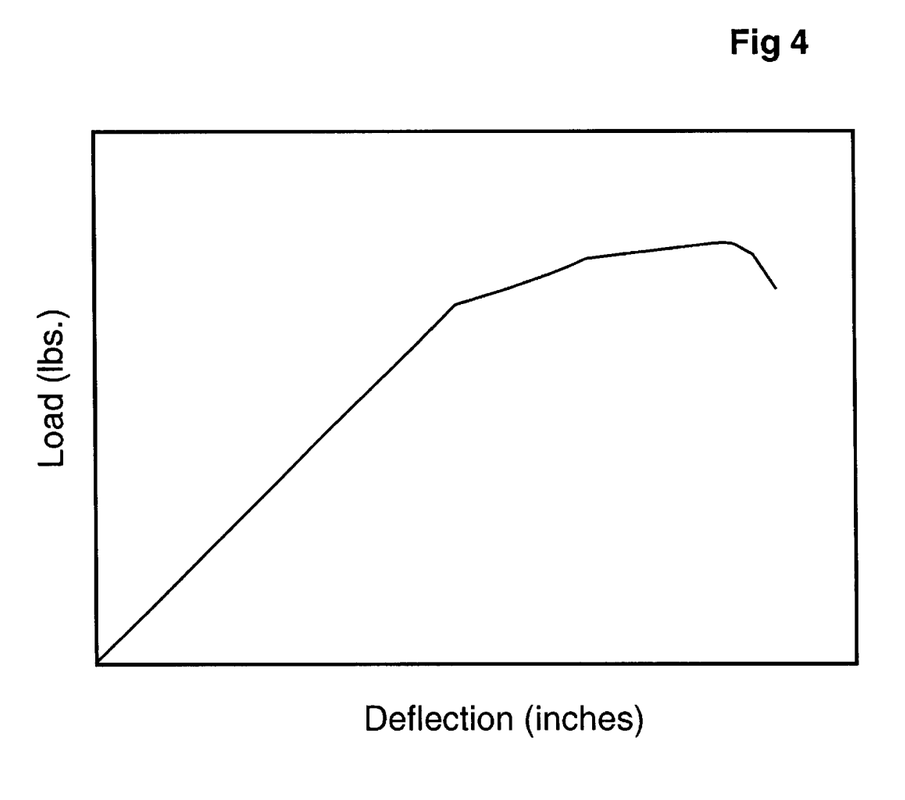
FIG. 4 is a graphical representation of stiffness in a beam.
Figure 5:
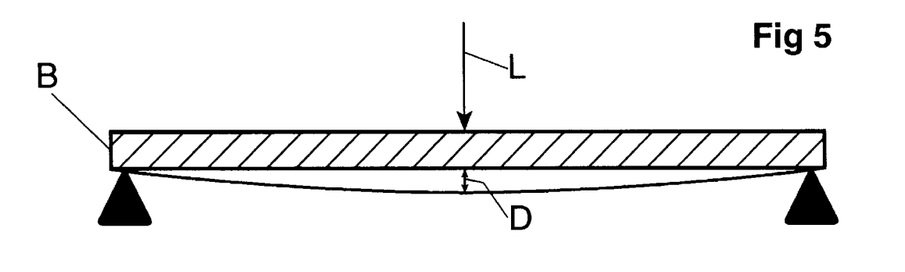
FIG. 5 (drawn above FIG. 4) is a schematic representation of the application of a load to a beam to measure stiffness.

It will be understood by those skilled in the art that the term "stiffness" is a measure of the ratio of load to deflection or resistance to elastic or recoverable bending. For clarity, a graphical representation of stiffness is drawn in FIG. 4 adjacent to a schematic illustration drawn in FIG. 5 showing the application of a load L to a sample beam B to produce a deflection D.

Selected experiments performed by the Applicant are shown in Table 2 and comprise Examples 1 to 5, each corresponding to a laminate structure for which the stiffness was measured and compared to an aluminum sheet having a thickness of 0.062 in. The results are shown graphically in FIGS. 13 to 17.

Applicant has conducted numerous experiments to show the utility of the proposed structural panel in accordance with the invention as a substitute for aluminum sheet. The experiments were performed on laminated panels in which the outer metal skins are sheets of low carbon uncoated steel with a nominal thickness of 0.0074 in. laminated to a core comprising a single web of kraft paperboard. Exemplary structures are shown in FIGS. 6 and 7.

Figure 6:
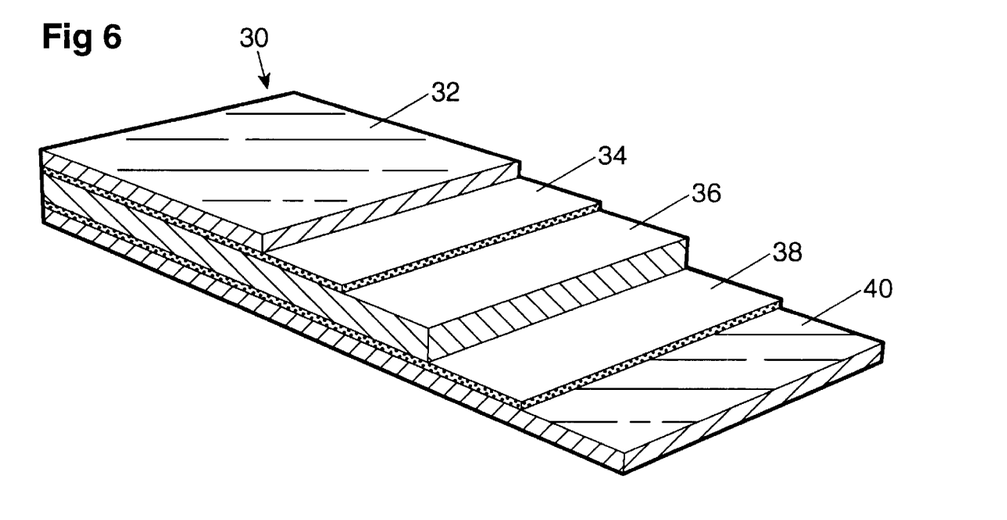
FIG. 6 is an enlarged fragmentary perspective view of a laminate in accordance with the invention, without any adhesive bridges.

In FIG. 6, the laminate is generally indicated by reference numeral 30 and comprises the following sequential layers: a first outer skin of sheet steel 32, a first adhesive layer 34, a kraft paperboard core 36, a second adhesive layer 38, and a second outer skin of sheet steel 40. A laminate of this kind was used in Example 2.

Figure 7:
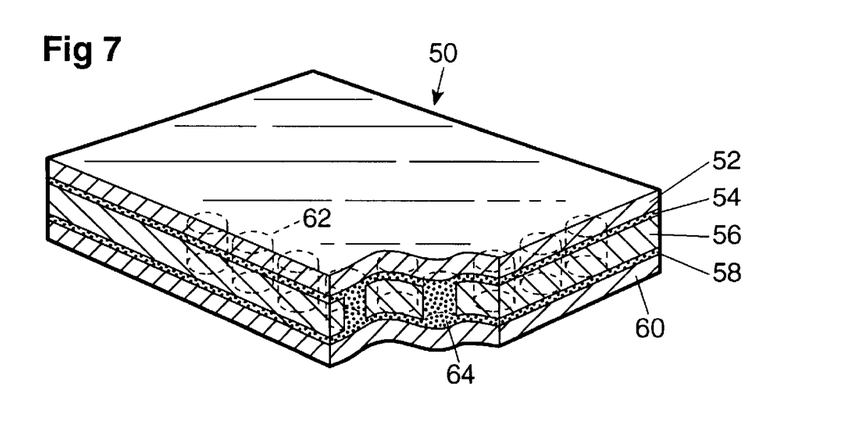
FIG. 7 is an enlarged perspective view, partially cut away, of a laminate in accordance with the invention with adhesive bridges.
Figure 8A:
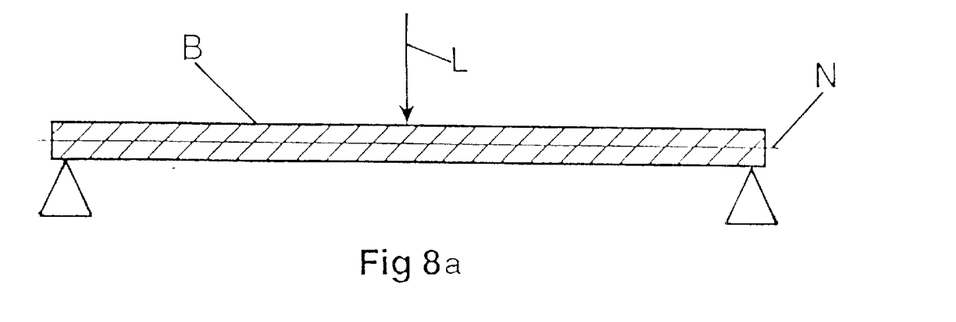
FIG. 8a is a schematic representation of the application of a load to a beam to show the neutral axis of bending.
Figure 8B:
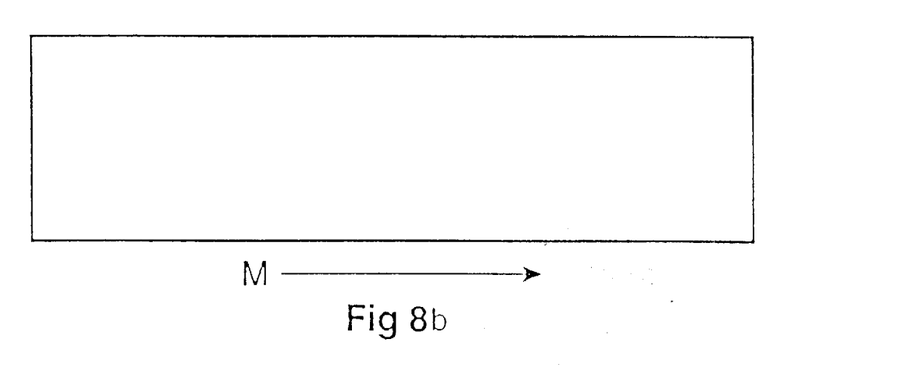
FIG. 8b is a plan view of a web of paper showing the machine direction of paper parallel to the neutral axis of bending.

The laminate used in the remaining Examples 1, 3–5, is generally indicated by reference numeral 50 in FIG. 7 and, similarly, comprises the following sequential layers: a first outer skin of sheet metal 52, a first adhesive layer 54, a kraft paperboard core 56, a second adhesive layer 58, and a second outer skin of sheet metal 60. However, in this structure, the kraft paperboard core 56 is perforated and has a matrix of circular openings 62 punched from the paper, each opening 62 having a nominal diameter of 1 mm (which could range between 0.5–2.0 mm) and being spaced from adjacent openings at approximately 6.4 mm intervals in longitudinal and transverse directions of the kraft paperboard core 56.

TABLE 2

|  | EXAMPLE 1 | EXAMPLE 2 | EXAMPLE 3 | EXAMPLE 4 | EXAMPLE 5 |
| --- | --- | --- | --- | --- | --- |
| STEEL SKIN THICKNESS | .0074" | .0074" | .0074" | .0074" | .0074" |
| STEEL SKIN GRADE | Low carbon, uncoated | Low carbon, uncoated | Low carbon, uncoated | Low carbon, uncoated | Low carbon, uncoated |
| CORE WEIGHT | 389 g/m2 | 423 g/m2 | 648 g/m2 | 422 g/m2 | 755 g/m2 |
| CORE THICKNESS | .028" | .028" | .039" (including resin) | .028" | .045" (including resin) |
| ORIENTATION | Perpendicular | Parallel | Parallel | Parallel | Perpendicular |
| RESIN IMPREGNATION | None | None | 40–50 wt % Phenol | None | 40–50% Phenol |
| ADHESIVE TYPE | Urethane base | Urethane base | Urethane base | Water base | Water base |
| ADHESIVE SPREAD (both sides) | 410 g/m2 | 370 g/m2 | 480 g/m2 | 300 g/m2 | 350 g/m2 |
| BRIDGING | 1 mm diameter | None | 1 mm diameter | 1 mm diameter | 1 mm diameter |

The openings 62 define paths for adhesively bridging the outer metal skins 52, 60 to each other, adhesive bridges 64 comprising columns of adhesive material oriented transversely to the layers of adhesive 34, 38 and integrally connected to such adhesive layers being provided to maintain the integrity of the laminated structure.

The paperboard core 56 used in the examples 1–5 is designated as a kraft paper which signifies that the pulp for forming the paper is produced using a sulfate process, typically caustic sodium hydroxide and sodium sulfide to delignify wood chips under high pressure and temperature in a digester which results in a pulp with a higher cellulose content and better bonding than paper made from a mechanical pulp. The kraft paperboard was sourced from Westvaco Corporation and is sold in association with the trademarks Kraftpak and Durasorb. Kraftpak and Durasorb are registered trademarks of Westvaco Corporation.

Figure 9A:
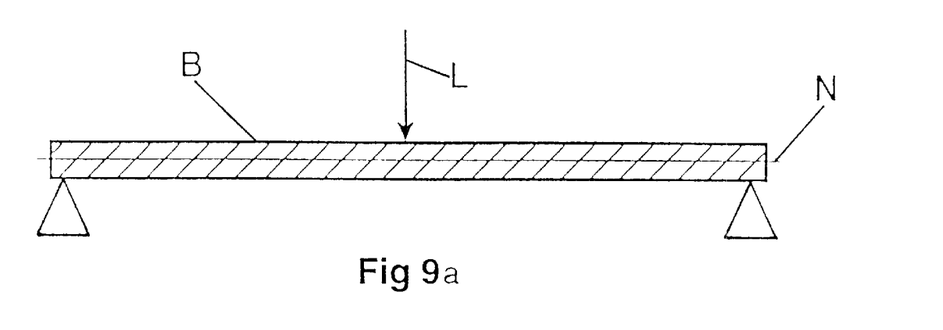
FIG. 9a is a schematic representation of the application of a load to a beam to show the neutral axis of bending.
Figure 9B:
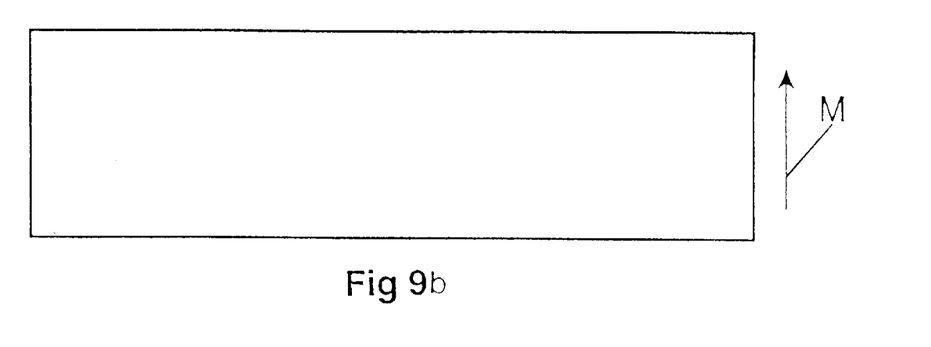
FIG. 9b is a plan view of a web of paper showing the machine direction of paper perpendicular to the neutral axis of bending.

It will be appreciated that cellulose fibers will align in a "machine direction" during production of the paper and that the orientation of the paper in the laminates is a factor which will affect the stiffness and strength of the laminate. The examples show that the laminates exhibit better performance when the machine direction of the kraft paper is aligned parallel to a neutral axis of bending (FIG. 8) than when the machine direction of the kraft paper is perpendicular to a neutral axis of bending (FIG. 9).

Figure 10:
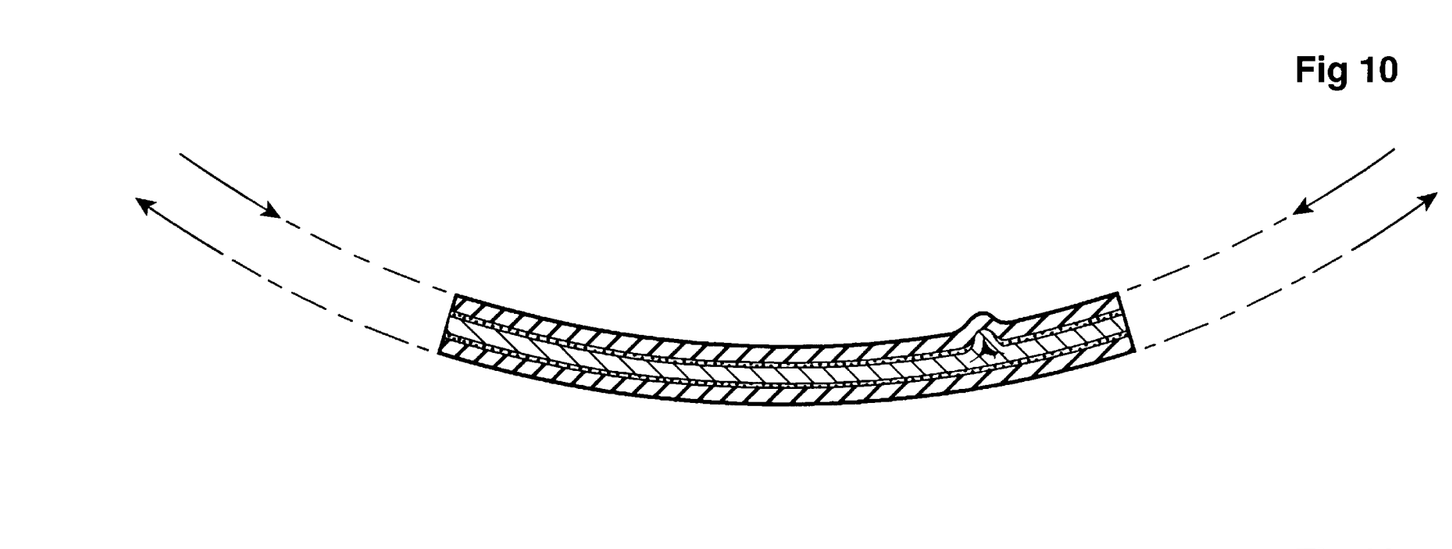
FIG. 10 is a schematic representation of a laminate (without adhesive bridges) in accordance with the invention exhibiting a skin buckle failure.

Another important factor affecting the performance of the laminates is the presence of the adhesive bridges 64. Without the bridging, the integrity of the laminate is susceptible to failure, in particular from a defect known as "buckling" and schematically shown in FIG. 10 and resulting from a compressive stress on the top skin during bending of the laminate. Here the fibers in the paper core become separated and there is a local delamination of the paper. This is in contrast with a mode of failure known as a "wrinkle" where there is a localized buckling of the outer skin only and the wavelength of the buckle is of the same order of magnitude as the core.

Figure 11:
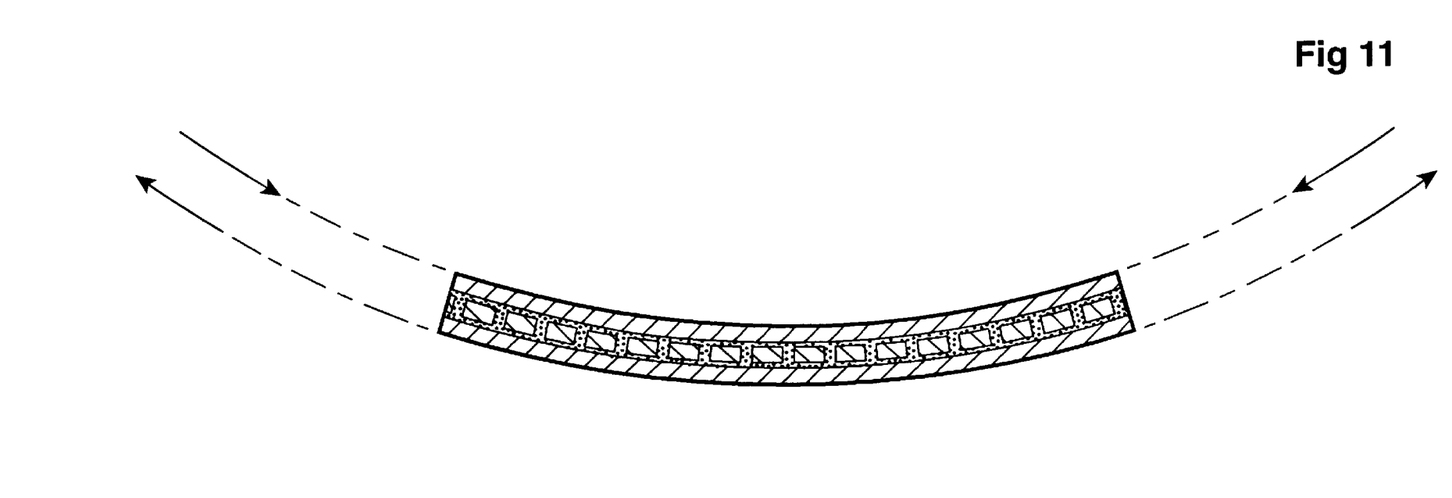
FIG. 11 is a schematic representation of a laminate having adhesive bridges under a compressive load and resisting skin buckle failure.
Figure 12:
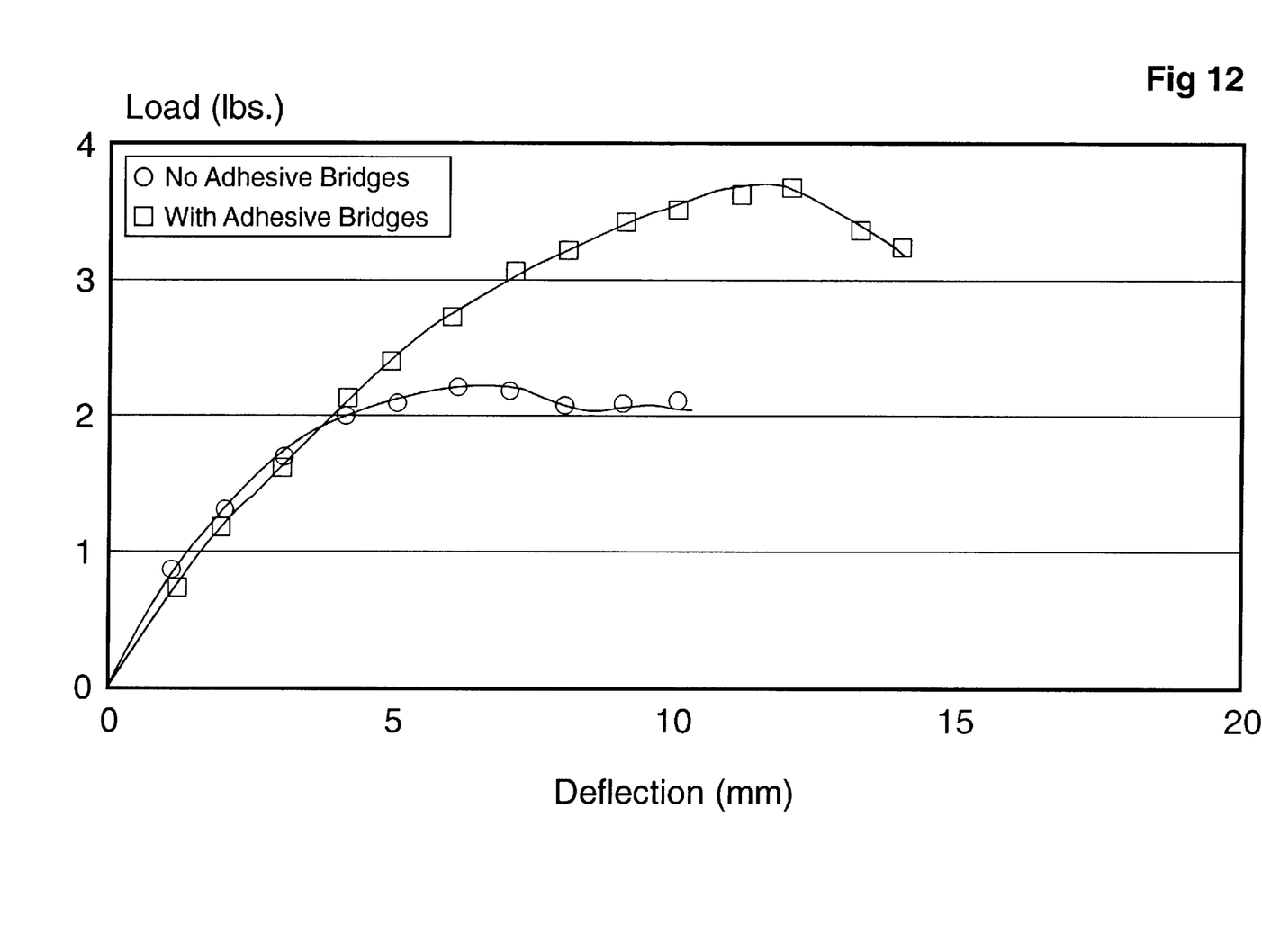
FIG. 12 is a graphical representation showing the strength improvement of a laminate made in accordance with the invention with adhesive bridges.
Figure 13:
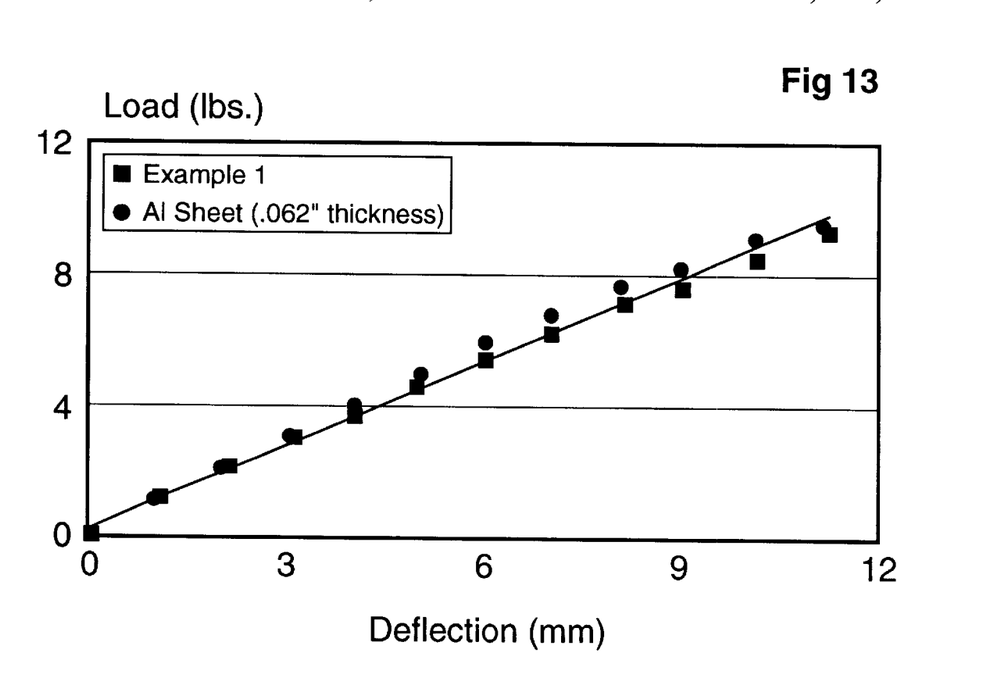
FIGS. 13 to 17 are graphical representations showing the stiffness of various laminates made in accordance with the invention and an aluminum sheet.
Figure 14:
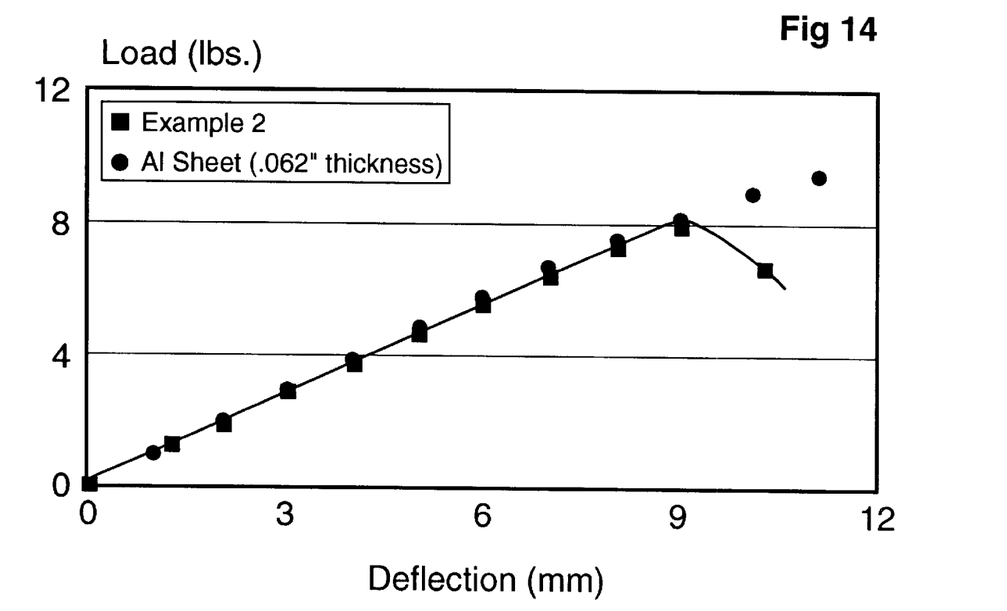
Figure 15:
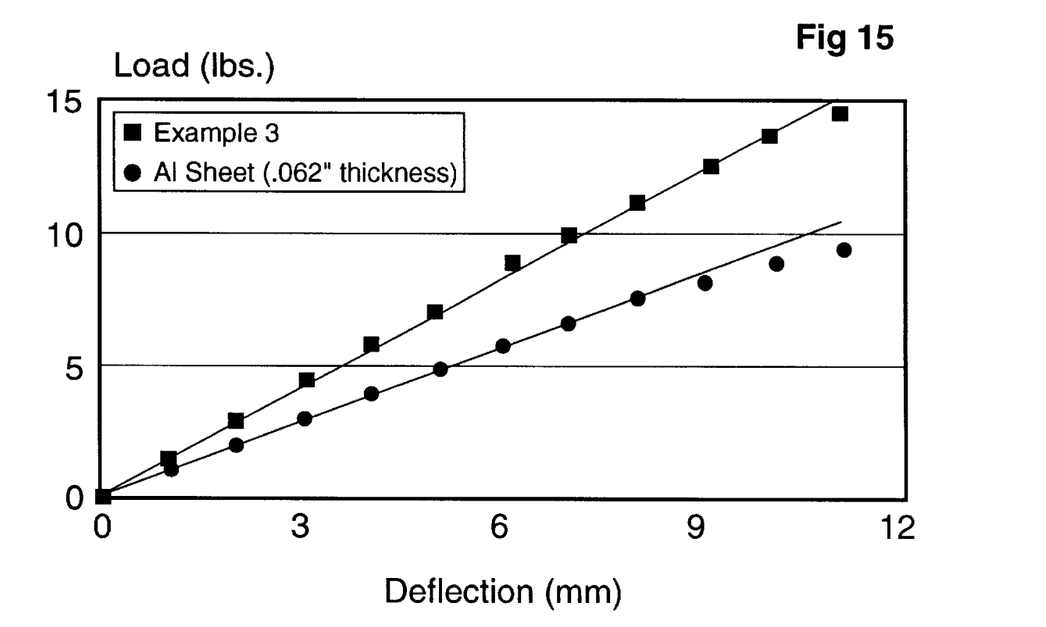
Figure 16:
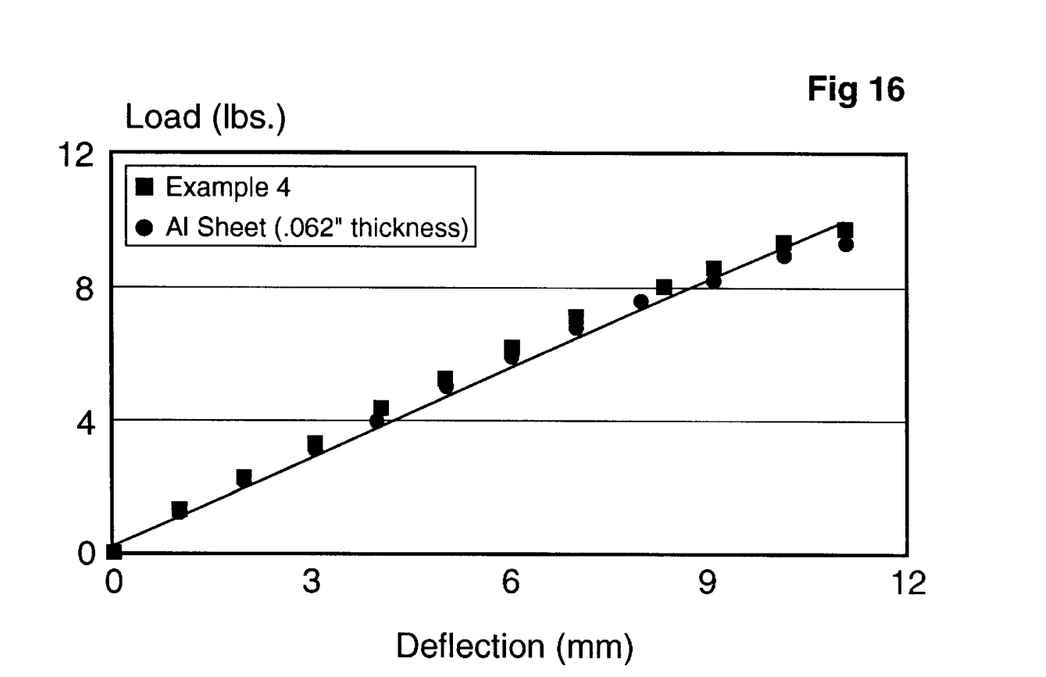
Figure 17:
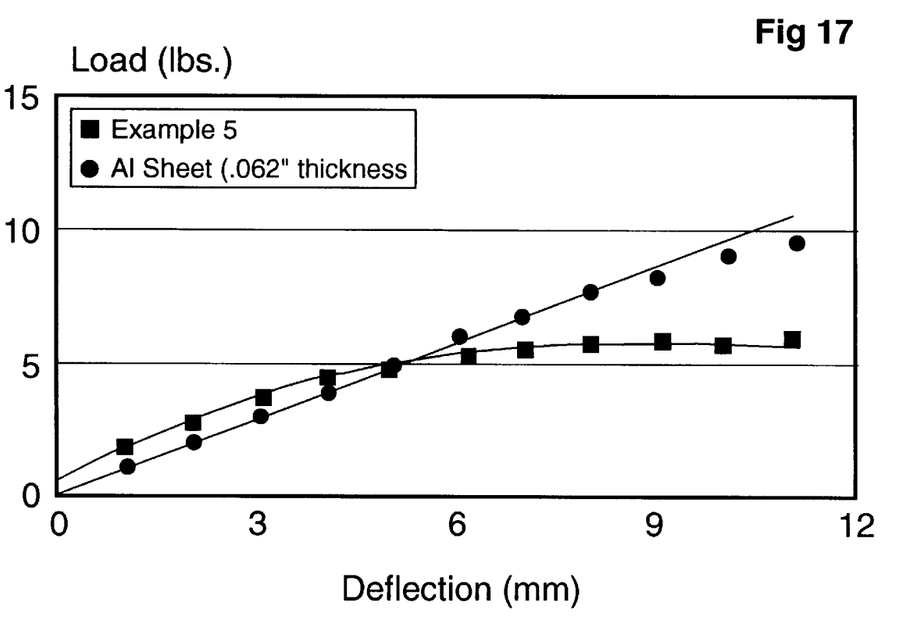

By selectively spacing the openings 62 in the paper core 56 so that adhesive bridges 64 are spaced from each other, within an estimated range of buckle wavelengths, as shown schematically in FIG. 11, one can optimize resistance to failure of the laminate resulting from buckling. The improved performance realized in a laminate having adhesive bridges 64 of the kind drawn in FIG. 7 when compared to a laminate without such adhesive bridges (Example 2) of the kind drawn in FIG. 6 is shown graphically in FIG. 12. However, since the theory of elastic buckling teaches that a buckle wavelength is dependent on sample geometry, the required maximum spacing of the openings 62 will have to be calculated on a case-by-case basis in accordance with the intended application of the laminate.

The examples also show that the kraft paperboard core may optimally be impregnated with resin to improve performance (Example 3) but that adequate performance may be achieved without resin impregnation (Example 1) and without the associated cost of such impregnation. It is therefore expected that the paper core will generally not be impregnated, or that impregnation may be done only in selected portions of the paperboard core such as on the edges of a structural panel to improve localized resistance to weathering conditions and the like.

The nature of the adhesive is also expected to be a factor which will affect performance as shown by Examples 4 and 5 where a water-based adhesive is used while a urethane-based adhesive is used in the remaining Examples 1 to 3.

Figure 18:
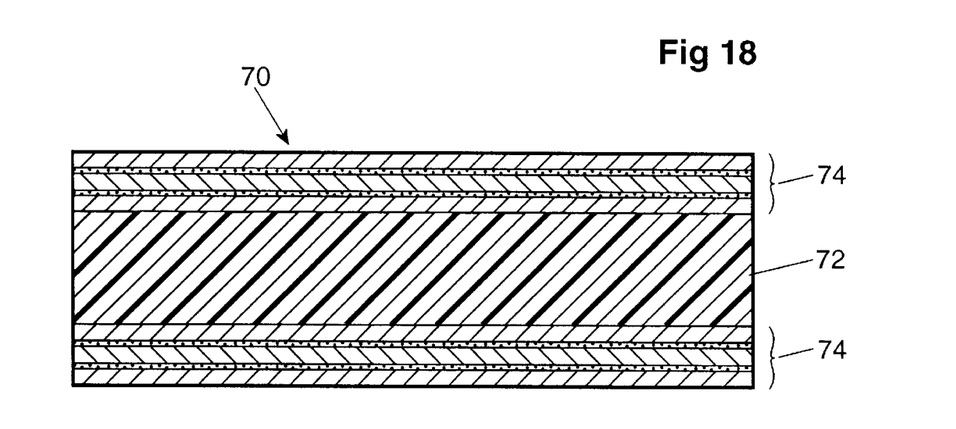
FIG. 18 (drawn adjacent FIG. 2) is a schematic cross-sectional view showing an application of a laminate in accordance with the invention as the exterior skin in association with a polymer core.

It will be appreciated that a structural panel made with a laminate in accordance with the invention will be dimensioned in accordance with the intended application and will have reinforcements where required to facilitate mounting of the panels to an underlying structure such as a framework. It is believed that a structural panel in accordance with the invention will find application wherever sheet metal is used and that it could replace such sheets whether they are used with both surfaces essentially exposed or whether they are themselves part of a composite panel 70 and bonded to a supplementary polymer core 72 so that the composite panel of the invention defines the outer skins 74. Such a structure is shown schematically in FIG. 18.

Several variations may be made to the above-described embodiments of the invention within the scope of the appended claims. It will be appreciated that the outer metal skins may be made from metals other than steel and could, for example, comprise aluminum or copper alloys. The metal skins may also comprise sheet steel selected from the following: cold rolled steel, galvanized steel, tin-coated steel, and stainless steel, including zinc aluminum alloyed castings and paint coatings in said sheets, without limitation.

Further, it will be understood that some sheet metals may be more desirable as skins for use in structural panels, according to the invention, than others. For example, it is envisaged that single-sided galvanized sheet may be preferred in some applications where an outer, galvanized, surface is required for improved weather resistance and an inner plain steel surface, without galvanizing or coating, is desirable for improved adhesion to the paper core.

Applicant also foresees that the outer metal skins may conveniently comprise galvanized steel sheet which is subsequently cold-rolled to a minimum acceptable thickness for the intended application without any subsequent annealing.

I claim:

1. A structural panel comprising first and second skins of sheet metal having a thickness of 0.005 in. to 0.012 in. and a paper core adhesively bonded between said skins, the paper core having a thickness of at least 0.01 in.

2. A structural panel according to claim 1 in which the sheet metal is steel sheet selected from the following group: cold rolled steel, galvanized steel, tin-coated steel, and stainless steel.

3. A structural panel according to claim 1 in which the paper core comprises a single web of paper.

4. A structural panel according to claim 1 in which the paper core has a plurality of openings formed therein extending between said first and second skins of sheet metal and defining paths for adhesively bridging said first and second skins of sheet metal.

5. A structural panel comprising first and second skins of steel having a thickness of 0.005 in. to 0.012 in.;

a paper core comprising a single web of kraft paper adhesively bonded between said skins of steel, the paper core having a thickness of between 0.01 in. and 0.05 in., and a plurality of openings formed in said paper core extending between said first and second skins of steel; and adhesive bridges comprising adhesive material disposed in said openings and adhesively bonding said first and second skins of sheet metal to each other.

6. A structural panel comprising:

first and second skins of sheet metal having a thickness of at least 0.005 in.;

a paper core sandwiched between said skins of sheet metal, the paper core having a thickness of at least 0.015 in.; and first and second layers of adhesive bonding said skins of sheet metal to respective sides of said paper core.

7. A structural panel according to claim 6 in which the sheet metal is steel sheet selected from the following group: cold rolled steel, galvanized steel, tin-coated steel, and stainless steel.

8. A structural panel according to claim 1 in which the sheet metal is aluminum sheet.

9. A structural panel according to claim 6 in which the sheet metal is aluminum sheet.

10. A structural panel according to claim 6 in which the paper core comprises a single web of paper.

11. A structural panel according to claim 1 in which the paper core comprises a plurality of webs of paper adhesively bonded to each other.

12. A structural panel according to claim 6 in which the paper core comprises a plurality of webs of paper adhesively bonded to each other.

13. A structural panel according to claim 1 in which the paper core is impregnated with resin.

14. A structural panel according to claim 6 in which the paper core is impregnated with resin.

15. A structural panel according to claim 6 in which the paper core has a plurality of openings formed therein extending between said first and second skins of sheet metal and defining paths for adhesively bridging said first and second skins of sheet metal.

16. A structural panel comprising:

first and second skins of sheet metal having a thickness of at least 0.005 in.;

a paper core sandwiched between said skins of sheet metal, the paper core having a thickness of at least 0.015 in. and having a plurality of openings formed therein extending between said first and second skins of sheet metal;

first and second layers of adhesive bonding said skins of sheet metal to respective sides of said paper core;

and adhesive bridges comprising adhesive material disposed in said openings and adhesively bonding said first and second skins of sheet metal to each other.

17. Structural panel comprising:

first and second skins of sheet metal;

a paper core sandwiched between said skins of sheet metal, the paper core having a plurality of openings formed therein extending between said first and second skins of sheet metal;

first and second layers of adhesive bonding said skins of sheet metal to respective sides of said paper core;

and adhesive bridges comprising adhesive material disposed in said openings and adhesively bonding said first and second skins of sheet metal to each other.

* * * * *